United States Patent Office 3,424,703
Patented Jan. 28, 1969

3,424,703
POLYCARBONATE FILM COMPOSITIONS EXHIBITING A LOW STATIC COEFFICIENT OF FRICTION
Curtis C. Jones, Jr., Westminster, Calif., assignor to General Electric Corporation, a corporation of New York
No Drawing. Continuation-in-part of application Ser. No. 400,950, Oct. 1, 1964. This application May 1, 1967, Ser. No. 634,863
U.S. Cl. 260—18   10 Claims
Int. Cl. C08g *39/00, 53/16*

ABSTRACT OF THE DISCLOSURE

A polycarbonate composition consisting of an aromatic polycarbonate having intimately dispersed therein a particular modifier which may be either silica or talc and which has an average diameter of up to 10 microns and which is present in an amount of from about 0.025% to about 0.50%. The silica or talc employed herein imparts to a film of an aromatic polycarbonate of less than 10 microns in thickness very low static coefficient of friction while still remaining essentially haze-free film. The film so produced in accordance herein can be used for such applications as packaging.

---

This application is a continuation-in-part of copending application Ser. No. 400,950 filed Oct. 1, 1964, now abandoned.

This invention relates to polycarbonate resins and, more particularly, is concerned with aromatic polycarbonate compositions which may be used to provide thin, relatively haze-free, self-sustaining films exhibiting a low coefficient of friction.

Due to their superior properties, films of high molecular weight aromatic carbonate polymers have gained increasing commercial prominence in recent years. For example, the carbonate polymer derived from bisphenol-A [2,2 bis-(4-hydroxy-phenyl)propane] provides films exhibiting excellent color, clarity, high dimensional stability, a high heat and acid resistance, and a high resistance to oxidative degradation up to temperatures of 160° C. The high ignition point and high aromatic content of carbonate polymers render films prepared therefrom resistant to burning, and at thisknesses above 0.04 inch, such films may be rated as self-extinguishing. In addition, polycarbonate films may be easily welded, are physiologically harmless and are stain repellent. The foregoing properties, coupled with good electrical characteristics over a temperature range of −100° C. to 135° C., render films prepared from aromatic carbonate polymers exceptionally suitable in a variety of technological applications.

Unfortunately, polycarbonate resin films are also characterized by a very high film-to-film coefficient of static friction. This makes handling of the polycarbonate film difficult and severely restricts the use of such film in automatic processing equipment, such as packaging equipment, for example, where successful operation necessitates coefficients of film friction considerably lower than those exhibited by the conventional polycarbonate resin films of the prior art. A variety of attempts have been made in an effort to produce polycarbonate resin compositions which would provide a self-sustaining film exhibiting a commercially acceptable coefficient of friction. To the best of my knowledge, however, such attempts have never been entirely satisfactory since they either have an adverse effect upon the optical clarity of the polycarbonate film, i.e., result in a film having a haze value which is not acceptable, or cause resin degradation or poor color. Consequently, a means for reducing the coefficient of friction of polycarbonate resin films without appreciably affecting any of their desirable optical and physical properties has heretofore not been available.

Unexpectedly, I have discovered that thin, self-sustaining polycarbonate films characterized by a coefficient of friction of not more than 3 and a haze value of less than 1% may be obtained by incorporating with the polycarbonate resin, in certain proportions, a modifier in the form of discrete particles having average diameters of up to 10 microns selected from the class consisting of silica and talc.

Briefly stated, I have found that when one or more of the above modifiers are added to a polycarbonate resin within a certain range, the resultant mixture may be used to provide a thin (i.e., 10 mils or less), self-sustaining film having a coefficient of friction considerably less than that of film formed of the unmodified polycarbonate. Most importantly, the self-sustaining films prepared in accordance with the present invention exhibit a haze value which is substantially equal to the unmodified polycarbonate film.

In accordance with my invention, it has been found that such highly desirable properties may be imparted to the polycarbonate resin when one or more of the above modifiers are added to the aromatic carbonate polymer in amounts ranging from about 0.025% to about 0.50% by weight, based upon the total weight of the carbonate polymer and modifier. Generally speaking, when amounts of less than about 0.025% are used, the improvement in the coefficient of friction is not detectable, and where the amount exceeds about 0.50%, the optical properties of the film are unsatisfactory. The addition of the additive to the polycarbonate may be accomplished in any manner so long as a thorough distribution of the additive in the polycarbonate is obtained. For example, the mixing of the materials may be accomplished by any one of the methods normally employed for incorporation of plasticizers of fillers into thermoplastic polymers including mixing rollers, Banbury mixers, extruders, ribbon blenders, powder blenders and other mixing equipment. The resulting mixture may be extruded into films with the aid of any well known film extrusion apparatus.

As noted above, films prepared from the polycarbonate compositions of the invention are characterized by a haze value which is less than 1%. In this connection, I have found that the particle size of the modifier used to provide the polycarbonate compositions of the invention is critical to the attainment of acceptable haze values in film subsequently formed therefrom. Specifically, I have found that the modifier must be in the form of fine particles having average diameters of 10 microns or less to be effective in providing polycarbonate mixtures which in film form have haze values of less than 1%.

Generally speaking, the modifiers which may be admixed with aromatic polycarbonate resins to provide the valuable film-forming compositions of the invention are well known commercially available materials. For example, silica (i.e. $SiO_2$) in the form of fine particles having average diameters of less than 10 microns.

The talc useful in the production of the resin compositions of the invention is a basic magnesium tetrasilicate having the formula $Mg_3Si_4O_{10}(OH)_2$. The talc may be used in pure form or as zinc stearate-coated talc, i.e., fine particles of basic magnesium tetrasilicate of the above formula which have been treated with zinc stearate, i.e., the zinc salt of stearic acid [$(CH_2)_{16}COOH$] to provide a monoatomic layer of zinc stearate on the surface of each talc particle. As used herein, the term "talc" embraces zinc stearate-coated talc as well as unmodified talc.

The aromatic carbonate polymers which may be used to provide the compositions of the invention may be prepared by reacting a dihydric phenol with a carbonate precursor such as phosgene, an aromatic bishaloformate or an aromatic carbonate ester. Generally speaking, such carbonate polymers may be typified as possessing recurring structural units of the formula

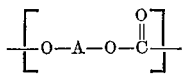

where A is a divalent aromatic radical of the dihydric phenol employed in the polymer producing reaction. Preferably, the carbonate polymers used to provide the resinous mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2 bis-(4-hydroxyphenyl)propane; hydroquinone; resorcinol; 2,2 bis-(4-hydroxyphenyl)pentane; 2,4' dihydroxydiphenylmethane; bis-(4-hydroxyphenyl)methane; bis-(4-hydroxy-5-nitrophenyl)methane; 1,1 bis-(4-hydroxyphenyl)ethane; 3,3 bis-(4-hydroxyphenyl)pentane; 2,6 dihydroxy naphthalene; bis-(4-hydroxyphenyl)sulfone; 2,4' dihydroxydiphenyl sulfone; bis-(4-hydroxyphenyl)diphenyl disulfone; 4,4' dihydroxydiphenyl ether; and 4,4' dihydroxy-2,5-diethoxydiphenyl ether. A variety of additional dihydric phenols which may be employed to provide such carbonate polymers are disclosed in U.S. Patent 2,999,835—Goldberg assigned to the assignee of the present invention. It is, of course, possible to employ two or more dihydric phenols or a dihydric phenol in combination with a glycol, a hydroxy- or acid-terminated polyester, or a dibasic acid in the event a carbonate copolymer rather than a homopolymer is desired for use in the preparation of the valuable film-forming polycarbonate resin mixtures of the invention. More specific directions for preparing polycarbonate resins, as well as other starting materials and polymers prepared therefrom, may be found in Canadian Patent 661,282 and in U.S. Patent 3,030,331, assigned to the assignee of this invention.

In order that those skilled in the art may better understand how the present invention may be practiced, the following examples are given by way of illustration and not by way of limitation. All parts and percentages are by weight unless otherwise noted. The average static coefficient of friction reported was determined by ASTM test D-1894-63. The percent haze reported was determined by ASTM test D-1003-61.

EXAMPLE I

The polycarbonate film-forming compositions of the invention are prepared by admixing a carbonate polymer powder, prepared by reacting 2,2 bis-(4-hydroxyphenyl) propane with phosgene in the presence of an acid acceptor and having an intrinsic viscosity of about 0.58 as measured in p-dioxane in deciliters per gram at 30° C., with the desired amount of one of the modifiers also in powder form to provide an intimate dispersion of the modifier and polycarbonate, said desired amount being as set forth in Table I. The mixing was accomplished by adding the modifier in powder form to a small quantity of polycarbonate powder to be used to insure good blending. The small blend was then added to the remaining portion of the polycarbonate powder and the mixture was blended vigorously in a ribbon type blender at room temperature. The mixture thus obtained was dried to remove moisture and extruded into pellets employing a conventional extruder at a temperature of about 525° F. The pellets were dried and extruded into films of the desired thickness by employing a conventional extruder with a sheet die orifice at a temperature of about 525° F.

Tests were then conducted on the resulting films to determine their coefficient of friction and haze value. The data obtained are set forth in Table I.

TABLE I

| Ex. | Additive | Concentration in mixture (weight percent) | Particle size (microns) | Thickness of film tested (mils) | Coefficient of friction | Haze value, percent |
| --- | --- | --- | --- | --- | --- | --- |
|  | None | [1] Control |  | 1 | 10.0 | 0.3 |
| 1 | Silica | 0.025 | 1.0 | 1 | 2.7 | 0.38 |
| 2 | do | 0.050 | 1.0 | 1 | 1.2 | 0.46 |
| 3 | do | 0.050 | 1.0 | 3 | 0.72 | 0.47 |
| 4 | do | 0.050 | 1.0 | 5 | 1.22 | 0.61 |
| 5 | do | 0.050 | 1.0 | 7 | 2.0 | 0.88 |
| 6 | do | 0.10 | 0.02 | 0.5 | 3.0 | 0.62 |
| 7 | do | 0.10 | 0.02 | 1.0 | 1.02 | 0.44 |
| 8 | do | 0.25 | 0.015 | 5.0 | 0.64 | 0.28 |
| 9 | do | 0.25 | 0.02 | 4.0 | 0.975 | <1.0 |
| 10 | do | 0.25 | 0.015 | 1.0 | 2.4 | 0.303 |
| 11 | do | 0.50 | 0.015 | 1.0 | 0.815 | 0.98 |
| 12 | Talc | 0.025 | <5 | 1.0 | 0.9 | 0.53 |
| 13 | do | 0.05 | <5 | 1.0 | 1.11 | 0.78 |
| 14 | Talc [2] | 0.025 | <5 | 1.0 | 0.9 | 0.53 |
| 15 | do [2] | 0.025 | <5 | 3.0 | 0.91 | 0.31 |
| 16 | do [2] | 0.05 | <5 | 0.75 | 2.0 | 0.68 |
| 17 | do [2] | 0.05 | <5 | 1.0 | 1.13 | 0.67 |
| 18 | do [2] | 0.05 | <5 | 3.0 | 0.95 | 0.48 |
| 19 | do [2] | 0.05 | <5 | 7.0 | 0.75 | 0.47 |

[1] Polycarbonate of 2,2-bis-(4-hydroxyphenyl)propane and phosgene, having an intrinsic viscosity of about 0.58.
[2] Zinc stearate coated talc used in this example.

The present invention thus affords the production of thin, self-sustaining polycarbonate resin films which have an acceptable haze value and which are characterized by a much lower coefficient of static friction than that exhibited by films prepared from polycarbonate compositions of the prior art. The films prepared from the compositions of the invention find wide utility as drafting films and in packaging and wrapping applications. In addition, the films of the invention are suitable for use as electrical insulating tapes, capacitor film dielectrics, and as supports for magnetic tape.

What is claimed is:
1. An aromatic polycarbonate film-forming composition characterized by a static coefficient of friction of not more than 3 and a haze value of less than 1% when in the form of a thin film of less than 10 mils, said composition containing an intimate dispersion, in a carbonate polymer of a dihydric phenol, of a modifier in the form of discrete particles having average diameters of up to 10 microns selected from the class consisting of silica and talc in an amount equal to from about 0.025% to about 0.50% of the total weight of carbonate polymer and modifier.

2. The composition of claim 1 in which the modifier is silica.

3. The composition of claim 1 in which the modifier is talc.

4. The composition of claim 1 in which the modifier is zinc stearate-coated talc.

5. The composition of claim 1 in which the dihydric phenol is 2,2 bis-(4-hydroxyphenyl)propane.

6. A thin, self-sustaining aromatic polycarbonate film of the composition of claim 1.

7. A thin, self-sustaining aromatic polycarbonate film of the composition of claim 2.

8. A thin, self-sustaining aromatic polycarbonate film of the composition of claim 3.

9. A thin, self-sustaining aromatic polycarbonate film of the composition of claim 4.

10. A thin, self-sustaining aromatic polycarbonate film of the composition of claim 5.

References Cited

UNITED STATES PATENTS 3,360,498  12/1967  Rawlings.
3,218,372  11/1965  Okamura et al.
3,189,662   6/1965  Vaughn et al.
3,153,008  10/1964  Fox.

FOREIGN PATENTS 670,376  1/1966  Belgium.

OTHER REFERENCES

Polycarbonates, Christopher et al., Reinhold, New York, 1962, pp. 151, 156–8.

Chemistry and Physics of Polycarbonates, Polymer Reviews, Schnell, Interscience, June 1964, pp. 190–191.

Derwent Belgian Patent Reports, N.D. 64, report issued Mar. 8, 1966. Plastics & Metal Finishing, p. 5 (copy available in scientific library).

DONALD E. CZAJA, *Primary Examiner.*

C. WARREN IVY, *Assistant Examiner.*

U.S. Cl. X.R.

260—37